June 9, 1925.

R. B. STEUART

TRANSMISSION BAND CLAMP

Filed June 3, 1924

1,540,815

INVENTOR
Robert B. Steuart
BY
ATTORNEY

Patented June 9, 1925.

1,540,815

UNITED STATES PATENT OFFICE.

ROBERT B. STEUART, OF KANSAS CITY, MISSOURI, ASSIGNOR TO IRVING E. JOHNSON, OF KANSAS CITY, MISSOURI.

TRANSMISSION-BAND CLAMP.

Application filed June 3, 1924. Serial No. 717,473.

*To all whom it may concern:*

Be it known that I, ROBERT B. STEUART, a citizen of the United States, residing at Kansas City, in the county of Jackson and State of Missouri, have invented certain new and useful Improvements in Transmission-Band Clamps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to transmission band clamps and it is particularly designed for use in holding the springs in a transmission such as is used in motor vehicles, the type of motor vehicles made by the Ford Motor Company of Detroit, Michigan. Ordinarily it is difficult to put a cover on the transmission because the springs on the clutch shaft which controls the clutch high speed and low speed on the reverse shaft and on the brake shaft tend to expand to such an extent that the cover cannot readily be applied.

I have provided an easily operated efficient tool for compressing and holding the transmission springs just referred to so that the cover may be easily put on. The device is so constructed that it may also serve as a handle for lifting the transmission while inspection, repairs or assembly is being made, and the invention consists in certain novel parts and combination of parts, all of which will be specifically described hereinafter, reference being had to the accompanying drawings, in which—

Figure 1:
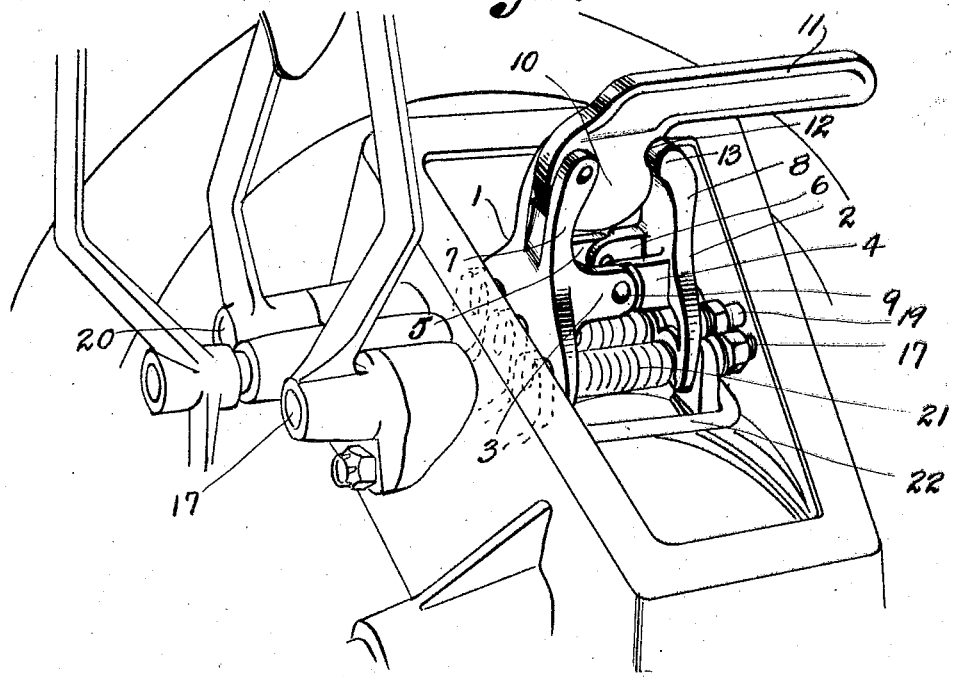
Figure 2:
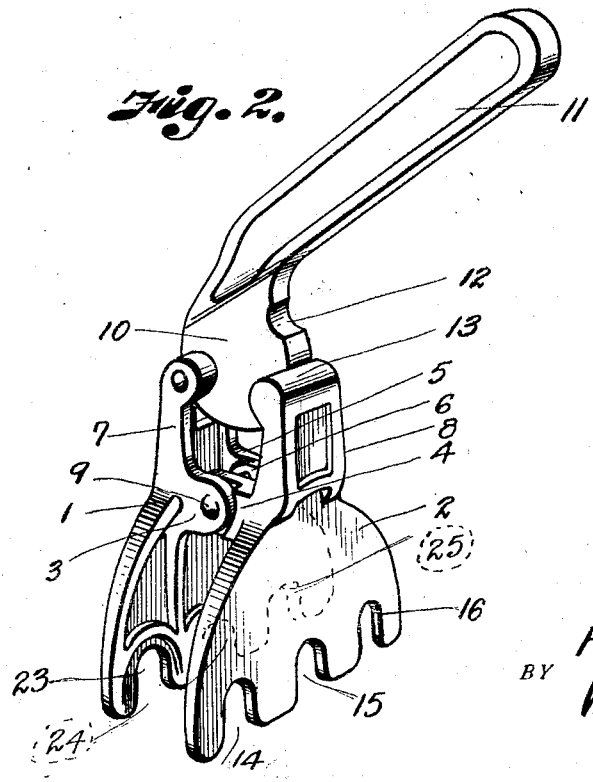

Fig. 1 is a perspective view of a so-called Ford transmission to which my invention is applied, and Fig. 2 is a detailed perspective view of the band clamp.

The band clamp is shown as comprising two jaw members 1 and 2 having inwardly projecting lugs 3, 4, 5 and 6 on the levers 7 and 8 so that the two levers can be pivoted together by passing a pivot member or bolt 9 through the lugs 3, 4, 5 and 6. At the upper end of one lever is a pivoted cam 10 having a handle 11, there being a notch 12 in the cam to receive the enlarged portion 13 of the lever 8 so that when the cam working between the ends of the levers 7 and 8 force them apart to bring the jaws 1 and 2 one toward the other, the enlarged portion 13 can drop into the notch 12 and hold the cam in fixed position so that upon the operator releasing the handle 11 the cam will not move to position to permit the jaws to open or spread apart.

Each jaw is notched at its lower end, the jaw 2 being shown with notches 14, 15 and 16 which may fit over the brake bolt 17, the speed gear shaft 19 and the reverse shaft 20 so that the jaws may have the ends of the springs 21 between them, then the cam action can be applied to move the jaws one toward the other to compress the springs, the clutch band being held by a loop 22 as is common practice. When the springs are compressed the cover can be put over the transmission, then the lever or handle 11 may be swung to position to release the cam from pressure against the part 13 of the jaw lever 8 so that the band clamp can be removed.

While I have shown the notches 14, 15 and 16 in Fig. 2, it is to be understood that similar notches designated 23, 24 and 25 (see Fig. 1) are provided in jaw 1 to slip over the rods 17, 19 and 20. It will be apparent that the device can be readily applied and easily detached from its transmission and by its use the cover may be conveniently applied and that when the cam is in the position shown in Fig. 1, the handle 11 may be used to lift the transmission if desired.

What I claim and desire to secure by Letters-Patent is:

1. A transmission clamp comprising two pivoted jaw members having rod engaging notches at their lower ends and a cam pivoted to the upper end of one jaw member and contacting with the other jaw member to cause the jaws to rock one with respect to the other, and a notch engaging member on one of the jaw members to engage a notch in the cam when the jaws are moved to clamping position.

2. A transmission clamp comprising two jaws having rod engaging notches at their lower ends, levers projecting from the upper ends of said jaws, means for pivoting the jaws together between the levers and the main portion of the jaws, a cam pivoted to one of the levers and a handle on the cam to operate it so that it will ride against the other lever to move the notched portions of the jaws one toward the other.

3. A transmission clamp comprising two pivoted jaw members having levers at their ends opposite the effective portions of the jaws, a cam pivoted to one of the levers provided with a notch, a handle on the cam and a portion on the opposite lever for engagement with the notch when the cam is moved in a position to move the effective portions of the jaws one toward the other.

In testimony whereof I affix my signature.

ROBERT B. STEUART, Capt.